(12) United States Patent
Tong et al.

(10) Patent No.: US 11,482,740 B2
(45) Date of Patent: Oct. 25, 2022

(54) POWER BATTERY PACK HAVING HEAT SUPERCONDUCTING HEAT EXCHANGER AND POWER BATTERY PACK SYSTEM

(71) Applicant: Karhe Technology Co., Ltd, Shanghai (CN)

(72) Inventors: Aixing Tong, Shanghai (CN); Qiao Zeng, Shanghai (CN)

(73) Assignee: ZHEJIANG JIAXI TECHNOLOGY CO., LTD., Hangzhou (CN)

( * ) Notice: Subject to any disclaimer, the term of this patent is extended or adjusted under 35 U.S.C. 154(b) by 199 days.

(21) Appl. No.: 16/759,359

(22) PCT Filed: Apr. 10, 2018

(86) PCT No.: PCT/CN2018/082548
§ 371 (c)(1),
(2) Date: Jul. 23, 2020

(87) PCT Pub. No.: WO2019/085398
PCT Pub. Date: May 9, 2019

(65) Prior Publication Data
US 2021/0367288 A1 Nov. 25, 2021

(30) Foreign Application Priority Data
Nov. 3, 2017 (CN) .......................... 201711071820.X (51) Int. Cl.
*H01M 10/6551* (2014.01)
*H01M 10/643* (2014.01)
(Continued)

(52) U.S. Cl.
CPC ..... *H01M 10/6551* (2015.04); *H01M 10/643* (2015.04); *H01M 10/6552* (2015.04);
(Continued)

(58) Field of Classification Search
CPC ........... H01M 10/6551; H01M 10/643; H01M 10/6552; H01M 10/6554; H01M 10/625; H01M 10/486
See application file for complete search history.

(56) References Cited

U.S. PATENT DOCUMENTS

| | | | | |
|---|---|---|---|---|
| 2012/0021260 A1* | 1/2012 | Yasui | ................ | H01M 10/6555 429/53 |
| 2013/0260194 A1* | 10/2013 | Meyer | ............... | H01M 10/6567 429/72 |
| 2017/0125866 A1 | 5/2017 | Zhou et al. | | |

FOREIGN PATENT DOCUMENTS

| | | |
|---|---|---|
| CN | 105742753 A | 7/2016 |
| CN | 106025439 A | 10/2016 |

(Continued)

*Primary Examiner* — Jimmy Vo (57) ABSTRACT

The present disclosure provides a power battery pack having a heat superconducting heat exchanger, and a power battery pack system. The power battery pack includes a heat superconducting heat exchanger and a plurality of battery cells. The heat superconducting heat exchanger includes a heat radiator, a heater, and a plurality of heat superconducting plates arranged at intervals in parallel. The heater is located at one side of the heat radiator. The heat superconducting plates are located between the heat radiator and the heater, a heat superconducting pipeline is formed inside each heat superconducting plate, each heat superconducting pipeline is a closed pipeline, and each heat superconducting pipeline is filled with a heat transfer medium. The battery cells are located between the heat radiator and the heater, and each battery cell is in contact with the corresponding heat superconducting plate.

15 Claims, 8 Drawing Sheets

(51) Int. Cl.
*H01M 10/6552* (2014.01)
*H01M 10/6554* (2014.01)
*H01M 10/625* (2014.01)
*H01M 10/48* (2006.01)

(52) U.S. Cl.
CPC ...... *H01M 10/6554* (2015.04); *H01M 10/486* (2013.01); *H01M 10/625* (2015.04)

(56) References Cited

FOREIGN PATENT DOCUMENTS

| | | |
|---|---|---|
| CN | 106785213 A | 5/2017 |
| CN | 107204314 A | 9/2017 |

\* cited by examiner

POWER BATTERY PACK HAVING HEAT SUPERCONDUCTING HEAT EXCHANGER AND POWER BATTERY PACK SYSTEM

CROSS REFERENCES TO RELATED APPLICATIONS

This is a Sect. 371 National Stage application of a PCT International Application No. PCT/CN2018/082548, filed on Apr. 10, 2018, which claims priority of a Chinese Patent Applications No. 201711071820X, filed on Nov. 3, 2017, the content of which is hereby incorporated by reference in its entirety for all purposes.

TECHNICAL FIELD

The present disclosure belongs to the technical field of semiconductor manufacturing, and particularly relates to a power battery pack having a heat superconducting heat exchanger, and a power battery pack system.

BACKGROUND

With the development of the era, a wave of new energy vehicles (electric vehicles) has risen all over the world, and the traditional gas-powered vehicles become being replaced by electric vehicles. The core component of electric vehicles is the power battery. The core part of a new energy electric vehicle is composed of one or more power battery packs. The power battery packs are densely packed with multiple battery cells. When the electric vehicle is running under heavy load conditions continuously, the power battery would be in the state of large rate discharging continuously. At this time, tremendous heat is rapidly generated in the battery pack. Most of the heat accumulates in the middle region of the battery pack, and the edge regions have less heat, which increases the temperature imbalance of each battery cell in the battery pack, and ultimately affects the performance of the entire battery pack. If the middle region cannot be cooled quickly and efficiently, the battery temperature will rise significantly, and lead to internal hot spots. Thermal runaway of the battery, oxidation-combustion of the electrolyte, even explosion may be caused.

The battery pack must be sealed, waterproof, dustproof, insulated, etc. In addition, uniform heat radiation must be considered in the design. Battery pack cooling has become an important area of research in the industry. The cooling of the power battery pack usually adopts two methods: direct air cooling and liquid cooling. With air cooling, cold air takes away heat directly from the battery cells. The main advantages of air cooling are simple structure, light weight, effective ventilation when harmful gases are generated, and low cost. The disadvantages of air cooling are low heat transfer coefficient between the cold air and the battery wall surface, slow cooling rate, low efficiency, large battery spacing, bulky volume, etc. The liquid cooling method is usually carried out by placing liquid cooling plates on the bottom of the battery or arranging microchannels between battery cells, so as to take away heat through the flow of liquid. The main advantages of liquid cooling are high heat transfer coefficient with the battery wall surface and fast cooling rate. The disadvantages of liquid cooling are high sealing requirements, heavy weight, complex repair and maintenance, the need for components such as water jackets and heat exchangers, and complicated structure.

In addition, in order to ensure the charging and discharging performance and safety at low temperature, it is necessary to preheat when the battery temperature is low. At present, there is no device for efficiently cooling the battery pack and heating the battery pack at the same time.

SUMMARY

The present disclosure provides a power battery pack having a heat superconducting heat exchanger, and a power battery pack system, to solve the problems in cooling the battery pack, as well as the problem that efficiently cooling and heating the battery pack cannot be realized at the same time.

The present disclosure further provides a power battery pack having a heat superconducting heat exchanger, including a heat superconducting heat exchanger and a plurality of battery cells; the heat superconducting heat exchanger includes a heat radiator, a heater, and a plurality of heat superconducting plates arranged at intervals in parallel; the heater is disposed at one side of the heat radiator, and is spaced from the heat radiator; the heat superconducting plates are disposed between the heat radiator and the heater, one end of the heat superconducting plate is connected to the heat radiator, and the other end of the heat superconducting plate is connected to the heater; a heat superconducting pipeline is formed inside the heat superconducting plate, the heat superconducting pipeline is a closed pipeline, and the heat superconducting pipeline is filled with a heat transfer medium; the battery cells are disposed between the heat radiator and the heater, and each battery cell is in contact with the heat superconducting plate.

As a preferred embodiment of the present disclosure, the heat superconducting plate includes a wave portion and a lateral portion.

The wave portion includes a first surface and a second surface opposite to the first surface. The wave portion further includes a plurality of first protrusion portions protruding from the first surface and a plurality of second protrusion portions protruding from the second surface. The first protrusion portions and the second protrusion portions are alternately distributed along the length direction of the heat superconducting plate and connected as a whole.

The lateral portion is disposed at two ends of the wave portion, and is connected to the end of the wave portion.

Each heat superconducting plate is connected to a surface of the heat radiator and a surface of the heater via the lateral portion; the battery cells are disposed on a first surface end and a second surface end of the wave portion. The battery cells disposed on the first surface end of the wave portion corresponds to the second protrusion portions, and are attached to the second protrusion portions. The battery cells disposed on the second surface end of the wave portion corresponds to the first protrusion portions, and are attached to the first protrusion portions.

As a preferred embodiment of the present disclosure, the first protrusion portions and the second protrusion portions are both arc-shaped protrusion portions, and the shape of the battery cells is a cylinder.

As a preferred embodiment of the present disclosure, the length direction of the wave portion is perpendicular to a surface of the lateral portion. The wave portion and the lateral portion are an integrally formed structure.

As a preferred embodiment of the present disclosure, the width of the wave portion is the same as the height of the battery cell, and the length of the lateral portion is the same as the height of the heat radiator.

As a preferred embodiment of the present disclosure, the heat superconducting plate includes a flat plate portion and a lateral portion; the lateral portion is disposed at two ends of the flat plate portion, and is connected to the end of the flat plate portion; each heat superconducting plate is connected to a surface of the heat radiator and a surface of the heater via the lateral portion; the shape of the battery cells is rectangular, the battery cells are disposed between the adjacent flat plate portions, and the battery cells are attached to at least one of the adjacent flat plate portions.

As a preferred embodiment of the present disclosure, the length direction of the flat plate portion is perpendicular to a surface of the lateral portion. The flat plate portion and the lateral portion are an integrally formed structure.

As a preferred embodiment of the present disclosure, the width of the flat plate portion is the same as the height of the battery cell, and the length of the lateral portion is the same as the height of the heat radiator.

As a preferred embodiment of the present disclosure, the heat superconducting plate has a composite plate-like structure, and the heat superconducting plate has a double-sided expansion, a single-sided expansion, or a double-sided flat shape.

As a preferred embodiment of the present disclosure, the heat radiator includes at least a cooling plate, a cooling pipeline is formed in the cooling plate, and the cooling plate includes an inlet and an outlet connected with the cooling pipeline.

As a preferred embodiment of the present disclosure, a surface of the cooling plate is connected to one end of the heat superconducting plate. A length direction of the cooling plate is parallel to a length direction of the heater, and is perpendicular to a length direction of the heat superconducting plate.

As a preferred embodiment of the present disclosure, the heat radiator further includes a heat radiation fin, and the heat radiation fin is disposed on the cooling plate.

As a preferred solution of the present invention, the heat radiator includes a fixed base plate and a heat radiation fin provided on the fixed base plate.

As a preferred embodiment of the present disclosure, a surface of the fixed base plate is connected to one end of the heat superconducting plate. A length direction of the fixed base plate is parallel to the length direction of the heater, and is perpendicular to the length direction of the heat superconducting plate. The heat radiation fin is plural in number, and a plurality of the heat radiation fin is inserted on a surface of the fixed base plate opposite to the heat superconducting plate.

The present disclosure further provides a power battery pack system, including: a power battery pack having a heat superconducting heat exchanger as described in any of the above-mentioned embodiments; a cooling medium system, at least including a cooling medium source for providing a cooling medium to the heat radiator; a heating controller, connected with the heater for controlling an operation of the heater.

As a preferred embodiment of the present disclosure, the power battery pack system further includes a temperature control system, including: a temperature measuring device, disposed on the power battery pack having a heat superconducting heat exchanger, the temperature measuring device measures a temperature of each battery cell; a temperature control device, connected with the temperature measuring device, the cooling medium source, and the heating controller, the temperature control device controls the cooling medium source to provide the cooling medium to the heat radiator or controls the heating controller to control heating of the heater according to the result of the temperature measuring device.

As described above, the power battery pack having a heat superconducting heat exchanger and the power battery pack system provided by the present disclosure have the following beneficial effects:

The power battery pack having a heat superconducting heat exchanger according to the present disclosure adopts a heat superconducting plate as an exchange structure for heat exchange with battery cells. By using the heat exchange method of heat superconducting, the equivalent thermal conductivity of the heat superconducting plate reaches 4000 W/m ° C. The heat superconducting plate has a fast heat-transfer rate, high heat-transfer efficiency, and even temperature. The problem of battery performance attenuation caused by uneven temperature and local overtemperature during quick charging and discharging of the battery cell in the power battery pack is reduced, thus improving the overall life of the power battery pack.

By providing a heat radiator and a heater on the two ends of the heat superconducting plate, the power battery pack having a heat superconducting heat exchanger according to the present disclosure can rapidly heat the battery cells when the temperature of the battery cells is low, thereby improving the heating startup time of the battery cells at low temperature. Meanwhile, the battery cells can be cooled rapidly when the temperature is high.

The power battery pack having a heat superconducting heat exchanger according to the present disclosure has the advantages of compact and flexible structure, small volume and weight, strong output capacity and high reliability, etc.

The power battery pack system of the present disclosure can automatically control the temperature of the battery cells, and can automatically control the temperature of the battery cells within the optimal working temperature range.

BRIEF DESCRIPTION OF THE DRAWINGS

FIGS. 1-4 are schematic diagrams of the power battery pack having a heat superconducting heat exchanger according to Embodiment 1 of the present disclosure.

DESCRIPTION OF REFERENCE NUMERALS

1 Power battery pack having a heat superconducting heat exchanger
11 Heat superconducting heat exchanger
111 Heat radiator
1111 Cooling plate
1112 Inlet
1113 Outlet
1114 Heat radiation fin
1115 Fixed base plate
112 Heater
113 Heat superconducting plate
1131 Wave portion
11311 First protrusion portion
11312 Second protrusion portion
1132 Lateral portion
1133 Flat plate portion
1134 First plate
11341 Raised structure
1135 Second plate
1136 Heat superconducting pipeline
1137 Heat transfer medium
1138 Non-pipeline portion
1139 Filling opening
12 Battery cell
2 Cooling medium source
21 Cooling medium supply pipeline
3 Heating controller
4 Temperature measuring device
5 Temperature control device

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Referring to FIGS. 1-13. It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during the actual implementation thereof may be freely changed, and the component layout configuration thereof may be more complex.

Embodiment 1

Referring to FIGS. 1-9, the present disclosure provides a power battery pack 1 having a heat superconducting heat exchanger, which includes a heat superconducting heat exchanger 11 and a plurality of battery cells 12. The heat superconducting heat exchanger 11 includes a heat radiator 111, a heater 112, and a plurality of heat superconducting plates 113 arranged at intervals in parallel. The heater 112 is disposed at one side of the heat radiator 111, and is spaced from the heat radiator 111. The heat superconducting plates 113 are disposed between the heat radiator 111 and the heater 112, one end of the heat superconducting plate 113 is connected to the heat radiator 111, and the other end of the heat superconducting plate 113 is connected to the heater 112. A heat superconducting pipeline 1136 is formed inside the heat superconducting plate 113 (as shown in FIGS. 4-7). The heat superconducting pipeline 1136 is a closed pipeline, and is filled with a heat transfer medium 1137. The battery cells 12 are disposed between the heat radiator 111 and the heater 112, and each battery cell 12 is in contact with the heat superconducting plate 113. Specifically, each battery cell 12 is attached to the heat superconducting plate 113.

As an example, the heat superconducting plate 113 realizes the heat exchange between the battery cell 12 and the heat radiator 111 or the heater 112 by adopting heat superconducting heat transfer technology. It should be noted herein that the heat superconducting heat transfer technology includes a heat pipe technology and a phase change inhibition (PCI) heat transfer technology. In the heat pipe technology, a working medium is filled in a sealed interconnected micro-channel system and the heat superconducting heat transfer is realized by the phase transition of evaporation and condensation of the working medium. In the phase change inhibition (PCI) heat transfer technology, the efficient heat transfer is achieved by controlling the microstructure state of the working medium in the sealed system (that is, the boiling of the liquid medium or the condensation of the gaseous medium is inhibited during the heat transfer process) and achieving consistency of the microstructure of the working medium based on the microstructure state.

As an example, the heat transfer medium 1137 is a fluid. Preferably, the heat transfer medium 1137 may be a gas, a liquid, or a mixture of a gas and a liquid. More preferably, in this embodiment, the heat transfer medium 1137 is a mixture of liquid and gas.

Figure 1:
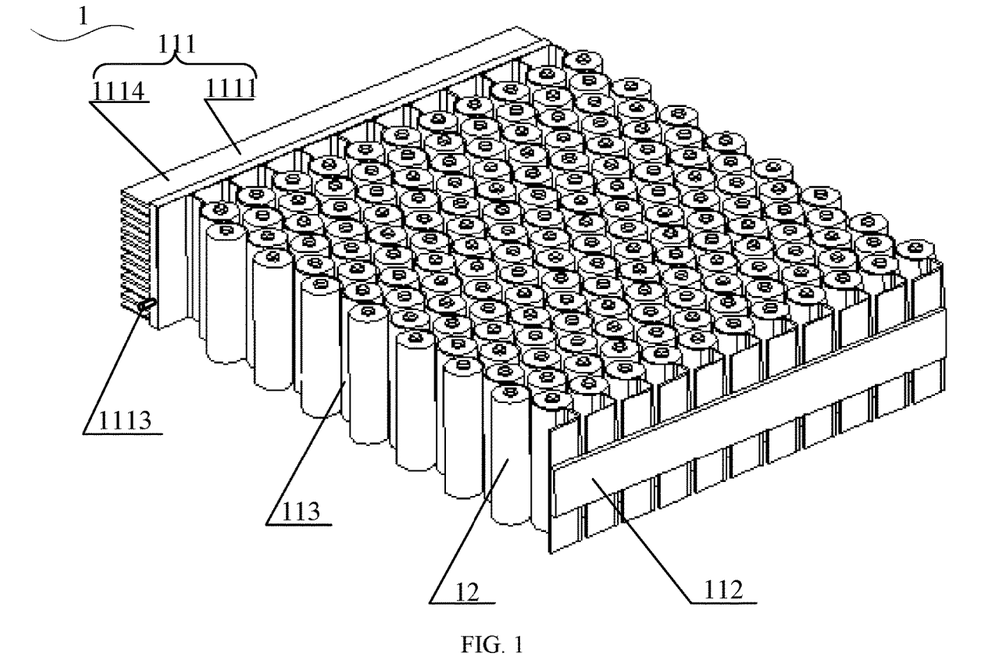
FIG. 1 shows a three-dimensional schematic diagram of a power battery pack having a heat superconducting heat exchanger according to Embodiment 1 of the present disclosure, in which the heat radiator includes a cooling plate and a heat radiation fin.
Figure 2:
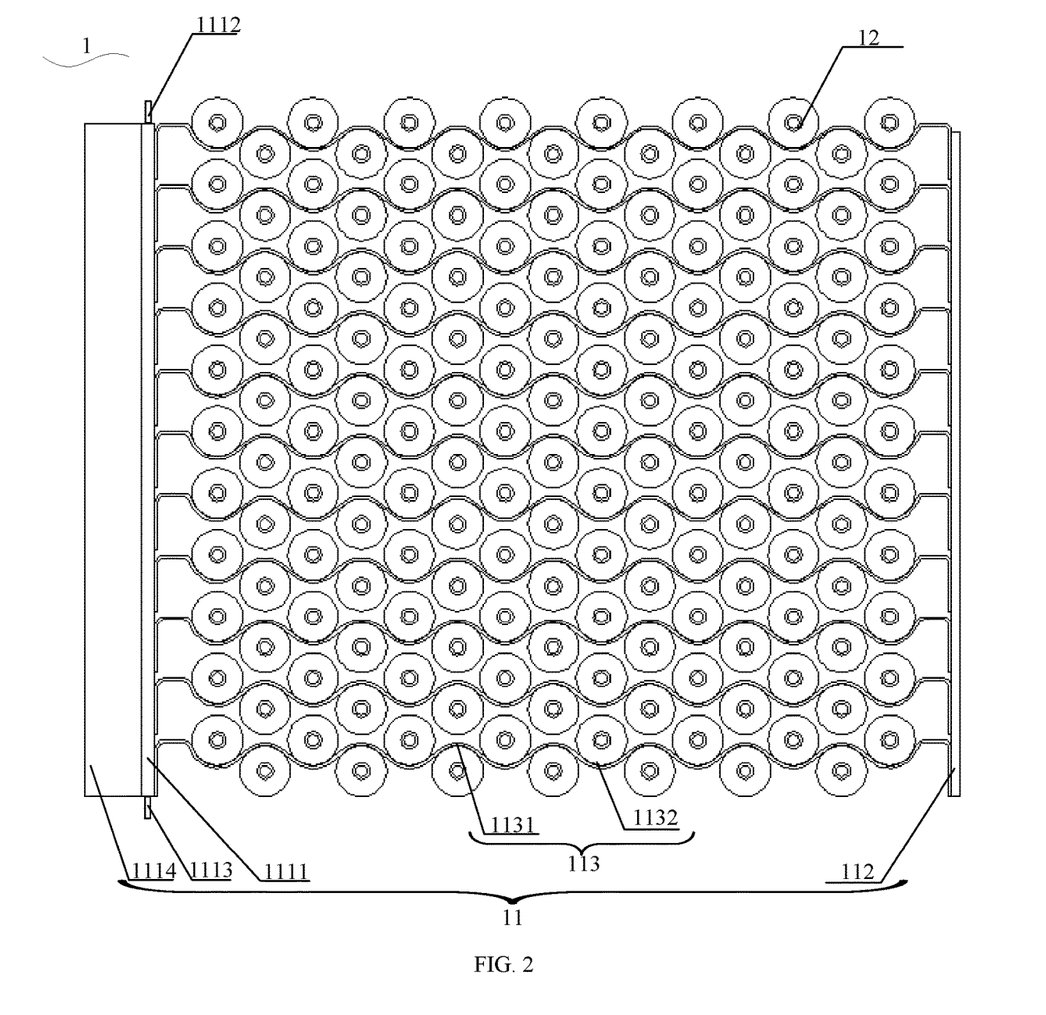
FIG. 2 shows a top view of a power battery pack having a heat superconducting heat exchanger according to Embodiment 1 of the present disclosure, in which the heat radiator includes a cooling plate and heat radiation fin.

In an embodiment, as shown in FIGS. 1 and 2, the heat radiator 111 includes at least a cooling plate 1111. A cooling pipeline (not shown) is formed in the cooling plate 1111, The cooling plate 1111 includes an inlet 1112 and an outlet 1113 connected with the cooling pipeline. A surface of the cooling plate 1111 is connected to one end of the heat superconducting plate 113. A length direction of the cooling plate 1111 is parallel to a length direction of the heater 112, and is perpendicular to a length direction of the heat superconducting plate 1113. That is, the surface of the cooling plate 1111 is parallel to the surface of the heater 112, and the length direction of the heat superconducting plate 113 is perpendicular to the surface of the cooling plate 1111 and the surface of the heater 112.

As an example, the heat radiator 111 further includes a heat dissipation fin 1114, and the heat radiation fin 1114 is disposed on the cooling plate 1111. Preferably, the heat radiation fin 1114 is vertically inserted on a surface of the cooling plate 1111 opposite to the heat superconducting plate 113, and the heat radiation fin 1114 is perpendicular to the surface of the cooling plate 1111. The heat radiation fin 1114 may be plural in number, and a plurality of the heat radiation fin 1114 is spaced parallel.

Figure 3:
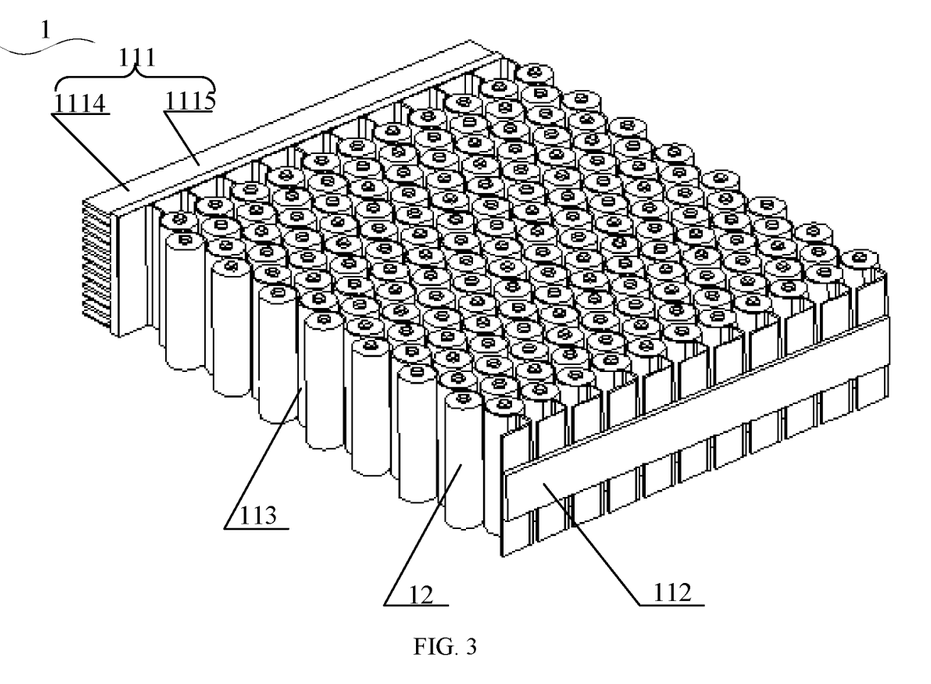
FIG. 3 shows a three-dimensional schematic diagram of a power battery pack having a heat superconducting heat exchanger according to Embodiment 1 of the present disclosure, in which the heat radiator includes a fixed base plate and a heat radiation fin.
Figure 4:
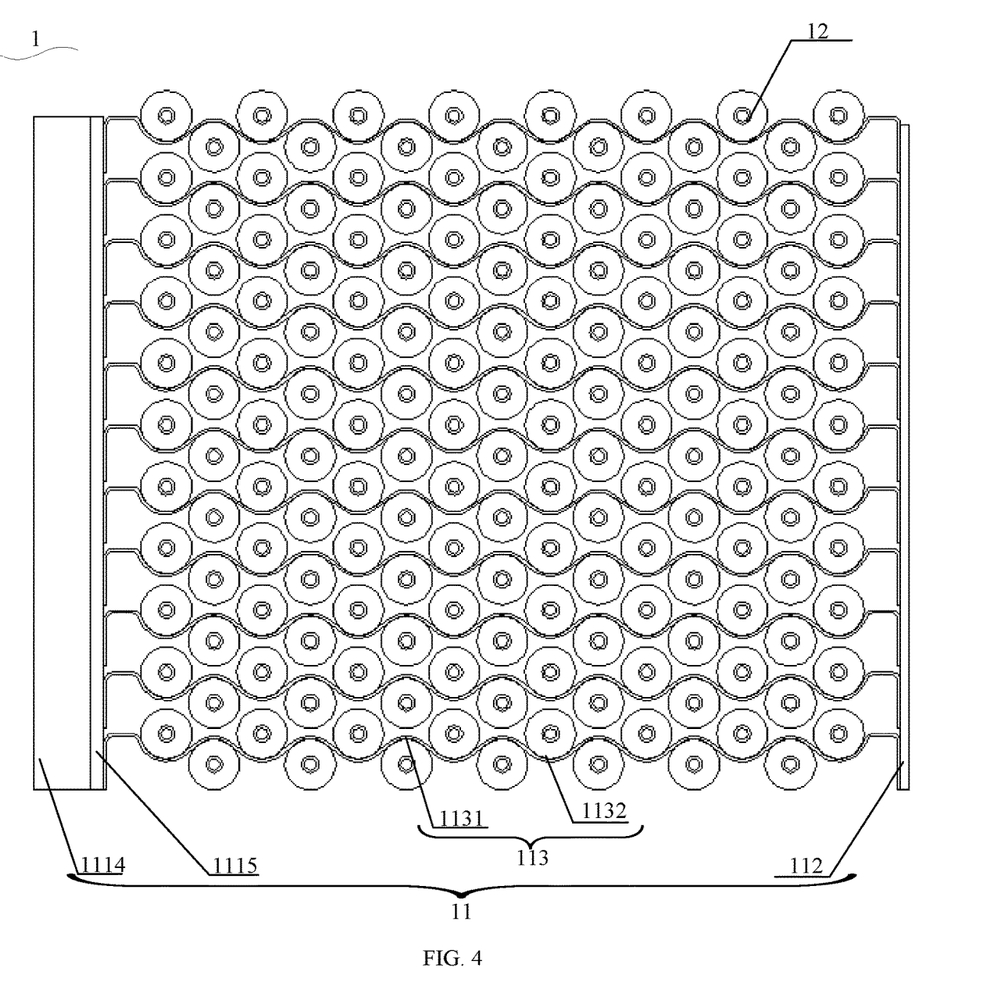
FIG. 4 shows a top view of a power battery pack having a heat superconducting heat exchanger according to Embodiment 1 of the present disclosure, in which the heat radiator includes a fixed base plate and a heat radiation fin.

In another example, as shown in FIGS. 3 and 4, the heat radiator 111 may include a fixed base plate 1115 and a heat radiation fin 1114 provided on the fixed substrate 1115. At this time, the fixed base plate 1115 is a solid base plate. Of course, the fixed substrate 1115 may contain a heat superconducting heat radiation pipeline and the like.

As an example, a surface of the fixed base plate 1115 is connected to one end of the heat superconducting plate 113. A length direction of the fixed base plate 1115 is parallel to the length direction of the heater 112, and is perpendicular to the length direction of the heat superconducting plate 113. The heat radiation fin 1114 is plural in number, and a plurality of the heat radiation fin 1114 is inserted on a surface of the fixed base plate 1115 opposite to the heat superconducting plate 113.

It should be noted that when the heat radiator 111 includes the cooling plate 1111 and the heat radiation fins 1114, a cooling medium (such as cooling water or cold wind) may be fed into the cooling pipeline in the cooling plate 1111, so as to dissipate the heat transferred by the heat superconducting plate 113. When the heat radiator 111 includes the fixed base plate 1115 and the heat radiation fins 1114, because there is no cooling medium pipeline inside the fixed base plate 1115, the heat radiation can be enhanced by blowing strong cold air to the heat radiation fins 1114, thereby dissipating the heat transferred by the heat superconducting plate 113.

Figure 5:
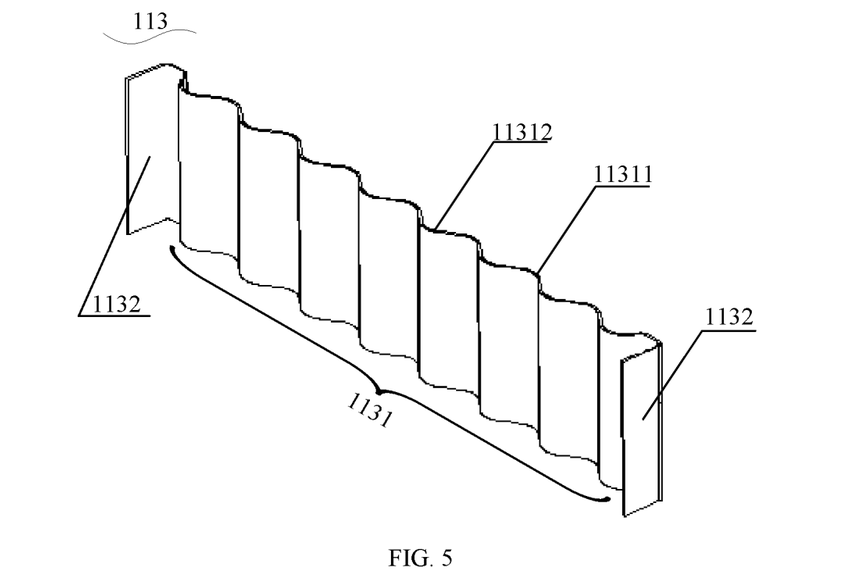
FIG. 5 shows a three-dimensional schematic diagram of a heat superconducting plate in a power battery pack having a heat superconducting heat exchanger according to Embodiment 1 of the present disclosure.

As an example, as shown in FIGS. 4 and 5, the heat superconducting plate 1313 includes a wave portion 1131 and a lateral portion 1132. The wave portion 1131 includes a first surface and a second surface opposite to the first surface. The wave portion 1131 further includes a plurality of first protrusion portions 11311 protruding toward the first surface and a plurality of second protrusion portions 11312 protruding toward the second surface. The first protrusion portions 11311 and the second protrusion portions 11312 are alternately distributed along the length direction of the heat superconducting plate 113 and connected as a whole. The lateral portion 1132 is located at two ends of the wave portion 1131, and is connected to the end of the wave portion 1131. Specifically, the number of the lateral portion 1132 is two. One lateral portion 1132 is located at one end of the wave portion 1131 and is connected to this end of the wave portion 1131 as an integral structure. The other lateral portion 1132 is located at the other end of the wave portion 1131 and is connected to this end of the wave portion 1131 as an integral structure. Each heat superconducting plate 113 is connected to a surface of the heat radiator 111 and a surface of the heater 112 via the lateral portion 1132 (when the heat radiator 111 includes the cooling plate 1111, the lateral portion 1132 is connected with the surface of the cooling plate 1111; when the heat radiator 111 includes the fixed base plate 1115 and the heat radiation fin 1114, the lateral portion 1132 is connected with a surface of the fixed base plate 1115 opposite to the heat radiation fin 1114). The battery cells 12 are disposed on a first surface and a second surface of the wave portion 1131. The battery cells 12 disposed on the first surface of the wave portion 1131 corresponds to the second protrusion portions 11312, and are attached to the second protrusion portions 11312. The battery cells 12 disposed on the second surface of the wave portion 1131 correspond to the first protrusion portions 11311, and are attached to the first protrusion portions 11311.

As an example, while the first protrusion portion 11311 is protruding toward the first surface of the wave portion 1131, a groove corresponding to the protrusion is formed on the second surface of the wave portion 1131, and the groove serves as a receiving space for the battery cell 12. Similarly, while the second protrusion portion 11312 is protruding toward the second surface of the wave portion 1131, a groove corresponding to the protrusion is formed on the first surface of the wave portion 1131, and the groove also serves as a receiving space for the battery cell 12.

As an example, the first protrusion portion 11311 and the second protrusion portion 11312 may both be arc-shaped protrusion portions, and the shape of the battery cells 12 is a cylinder. At this time, the radians of the first protrusion portion 11311 and the second protrusion portion 11312 matches the radian of the surface of the battery cells 12. The battery cells 12 are in full contact with the first protrusion portion 11311 and the second protrusion portion 11312 as far as possible. The contact area between the battery cells 12 and the first protrusion portion 11311 and the second protrusion portion 11312 is maximized. There is little space between the battery cells 12 and the first protrusion portion 11311 and the second protrusion portion 11312. The heat exchange between the heat superconducting plate 113 and each battery cell 12 is efficient. Of course, in other examples, the shape of the battery cells 12 may be a hexagon, an octagon, etc. However, no matter which shape of the battery cells 12 is, the shape of the first protrusion portion 11311 and the second protrusion portion 11312 should match the shape of the battery cells 12 in contact with them.

As an example, the length direction of the wave portion 1131 is perpendicular to a surface of the lateral portion 1132. The wave portion 1131 and the lateral portion 1132 are an integrally formed structure. At this time, the length direction of the wave portion 1131 is parallel to the length direction of the heat superconducting plate 113. The surface of the lateral portion 1132 is parallel to a surface of the cooling plate 1111 or a surface of the fixed base plate 1115, and is parallel to a surface of the heater 112.

It should be noted that the wave portion 1131 and the lateral portion 1132 being an integrally formed structure means that the heat superconducting plate 113 with the wave portion 1131 and the lateral portion 1132 is formed by rolling and bending a flat heat superconducting plate.

As an example, the spacing between the adjacent heat superconducting plates 113 may be set according to actual needs, but the spacing between the adjacent heat superconducting plates 113 must be greater than the lateral dimension of one battery cell 12 (that is, the dimension in a direction perpendicular to the height of the battery cells 12) to ensure that at least one battery cell 12 can be placed between adjacent heat superconducting plates 113. Preferably, in this embodiment, the spacing between the adjacent heat superconducting plates 113 is preferably greater than the lateral dimension of one battery cell 12, and is smaller than the lateral dimensions of two battery cells 12, such that a plurality of battery cell 12 staggered is placed between the adjacent heat superconducting plates 113 along the length direction of the heat superconducting plate 113.

As an example, the width of the wave portion 1131 may be the same as the height of the battery cells 12, and the length of the lateral portion 1132 is the same as the height of the heat radiator 111 (the height of the heat radiator 111 equals to the width of the cooling plate 1111 or the width of the fixed base plate 1115). Of course, in other examples, the width of the wave portion 1131 may be smaller than the height of the battery cells 12, or may be greater than the height of the battery cells 12. Similarly, the length of the lateral portion 1132 may be smaller than the height of the heat radiator 111, or may be greater than the height of the heat radiator 111. It should be noted that the width of the wave portion 1131 herein refers to a dimension in a direction perpendicular to the length direction of the wave portion 1131, and the length of the lateral portion 1132 refers to a dimension of the lateral portion 1132 along a direction perpendicular to the length direction of the wave portion 1131.

Figure 6:
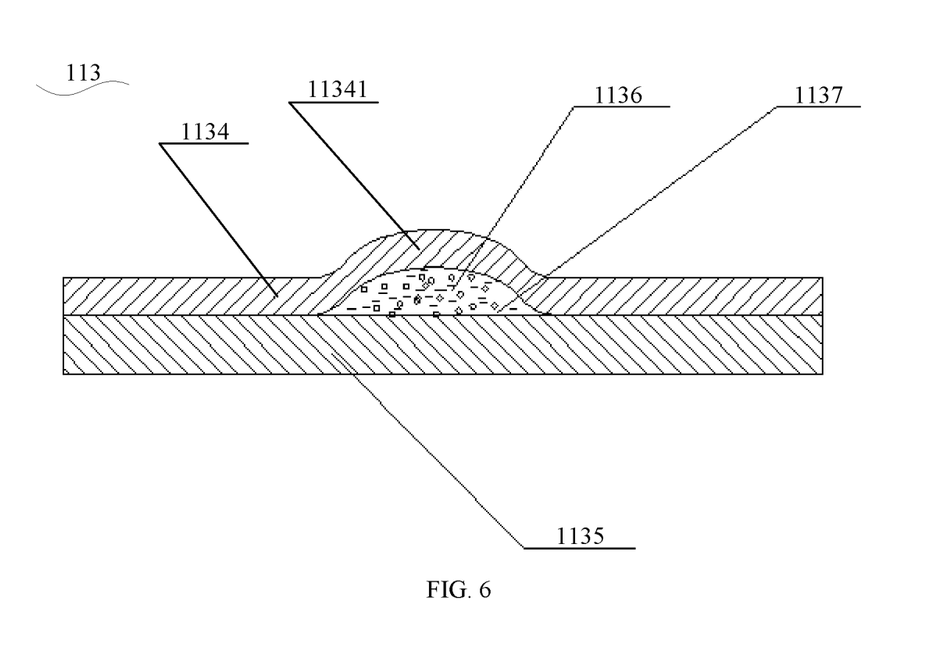
FIGS. 6-7 are enlarged partial cross-sectional structural diagrams of a heat superconducting plate in a power battery pack having a heat superconducting heat exchanger according to Embodiment 1 of the present disclosure. The heat superconducting plate in FIG. 6 has a single-sided expansion shape, and the heat superconducting plate in FIG. 7 has a double-sided flat shape.
Figure 7:
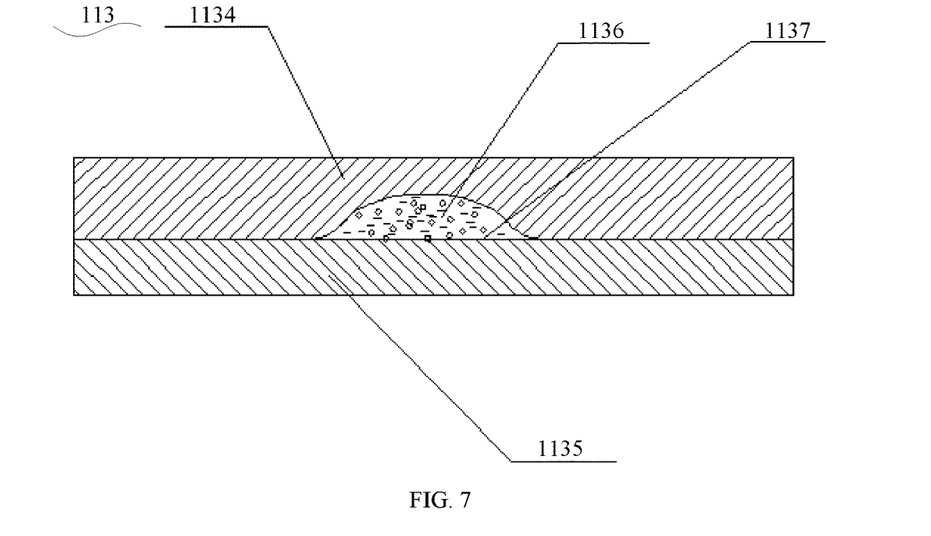

As an example, as shown in FIGS. 6 and 7, the heat superconducting plate 113 may be a composite plate structure including a first plate 1134 and a second plate 1135.

In an example, as shown in FIG. 6, the heat superconducting plate 113 is expanded in one side. An embossing channel formed by an embossing process or an inflation channel formed by an inflation process is formed on a surface of the first plate 1134. At the same time, a raised structure 11341 corresponding to the embossing channel or the inflation channel is formed on the other surface of the first plate 1134. The first plate 1134 and the second plate 1135 may be compounded together by the welding process, and the surface of the first plate 1134 with the embossing channel or the inflation channel is a composite surface. After the first plate 1134 and the second plate 1135 are composited, the embossing channel or the inflation channel constitutes the heat superconducting pipeline 1136. Of course, in other examples, an etching channel or an inflation channel is formed only on a surface of the second plate 1135.

In another example, as shown in FIG. 7, the heat superconducting plate 113 may have a double-sided flat shape. An etching channel is formed on a surface of the first plate 1134. The first plate 1134 and the second plate 1135 are compounded together by a welding process, and the surface with the etching channel is a composite surface. After the first plate 1134 and the second plate 1135 are composited, the etching channel constitutes the heat superconducting pipeline 1136. In other examples, the etching channel may be formed only on one surface of the second plate 1135, or on both the first plate 1134 and the second plate 1135. After the first plate 1134 and the second plate 1135 are composited, the etching channel on the first plate 1134 and the etching channel on the second plate 1135 jointly constitute the heat superconducting pipeline 1136.

In yet another example, the heat superconducting plate 113 may be expanded in double sides. An embossing channel or an inflation channel is formed on both adjacent surfaces of the first plate 1134 and the second plate 1135. A raised structure 11341 corresponding to the embossing channel or the inflation channel is formed on both of the first plate 1134 and the second plate 1135. After the first plate 1134 and the second plate 1135 are composited by a welding process, the embossing channel or the inflation channel on the first plate 1134 and the embossing channel or the inflation channel on the second plate 1135 jointly constitute the heat superconducting pipeline 1136.

Figure 8:
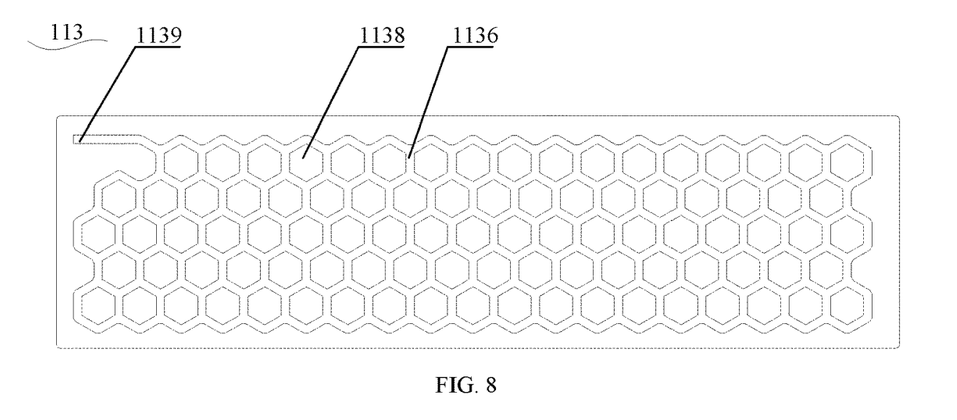
FIGS. 8-9 are schematic diagrams of a heat superconducting plate in a power battery pack having a heat superconducting heat exchanger according to Embodiment 1 of the present disclosure. The heat superconducting pipeline in the heat superconducting plate in FIG. 8 has a hexagonal honeycomb-like shape, and the heat superconducting pipeline in the heat superconducting plate in FIG. 9 has a rectangular grid-like shape.
Figure 9:
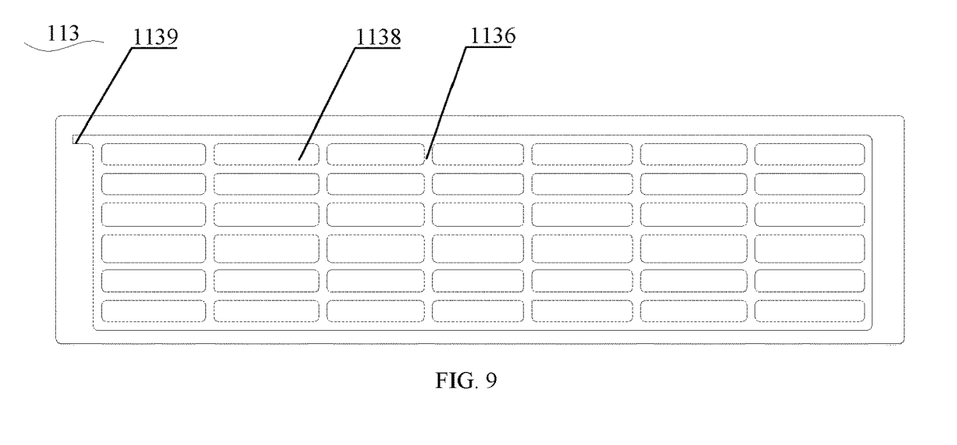

As an example, the shape of the heat superconducting pipeline 1136 in the heat superconducting plate 113 may be set according to actual needs, for example, hexagonal honeycombs (as shown in FIG. 8), circular honeycombs, rectangular grids (as shown in FIG. 9), a plurality of U shapes connected in series, diamonds, triangles, circles, crisscross network, or any combination thereof. It should be noted that, as shown in FIGS. 6 and 7, the portion between the heat superconducting pipelines 1136 and the periphery portion of the heat superconducting pipeline 1136 are both non-pipeline portions 1138. When the heat superconducting plate 113 adopts an inflation process to form the heat superconducting pipeline 1136, a filling opening 1139 is formed in the heat superconducting plate 113. After the first plate 1134 and the second plate 1135 are composited and the heat superconducting pipeline 1136 is formed in the heat superconducting plate 113, a heat transfer medium is fed into the heat superconducting pipeline 1136. However, after filling the heat transfer medium 1137, the filling opening 1139 is sealed to ensure that the heat superconducting pipeline 1136 is a sealed pipeline.

As an example, the materials of the first plate 1134 and the second plate 1135 have good thermal conductivity. Preferably, in this embodiment, the materials of the first plate 1134 and the second plate 1135 may be copper, copper alloy, aluminum or aluminum alloy, or any combination thereof. The materials of the first plate 1134 and the second plate 1135 may be the same or different. Preferably, in this embodiment, the materials of the first plate 1134 and the second plate 1135 are the same.

The working principle of the power battery pack 1 having a heat superconducting heat exchanger according to the present disclosure is: when the battery cell 12 needs to be cooled, the heat generated by the battery cell 12 is conducted to the heat radiator 111 through the heat superconducting plate 113, then conducted to the outside of the battery pack through the heat radiator 111; when the battery cell 12 needs to be heated, the heat generated by the heater 112 is rapidly and evenly conducted to each battery cell 12 through the heat superconducting plate 113, such that each battery cell 12 is heated evenly.

The power battery pack 1 having a heat superconducting heat exchanger according to the present disclosure adopts a heat superconducting plate 113 as an exchange structure for heat exchange with battery cells. By using a heat exchange method of heat superconducting, the equivalent thermal conductivity of the heat superconducting plate 113 reaches 4000 W/m ° C. The heat superconducting plate has a fast heat-transfer rate, high heat-transfer efficiency, and even temperature. The problem of battery performance attenuation caused by uneven temperature and local overtemperature during quick charging and discharging of the battery cell 12 in the power battery pack is reduced, thus improving the overall life of the power battery pack. By providing a heat radiator 111 and a heater 112 on the two ends of the heat superconducting plate, the battery cells 12 can be heated rapidly at low temperature, thereby improving the heating startup time of the battery cells 12 at low temperature. Meanwhile, the battery cells 12 can be cooled rapidly when the temperature is high. The power battery pack 1 having a heat superconducting heat exchanger according to the present disclosure has the advantages of compact and flexible structure, small volume and weight, strong output capacity and high reliability, etc.

Embodiment 2

Figure 10:
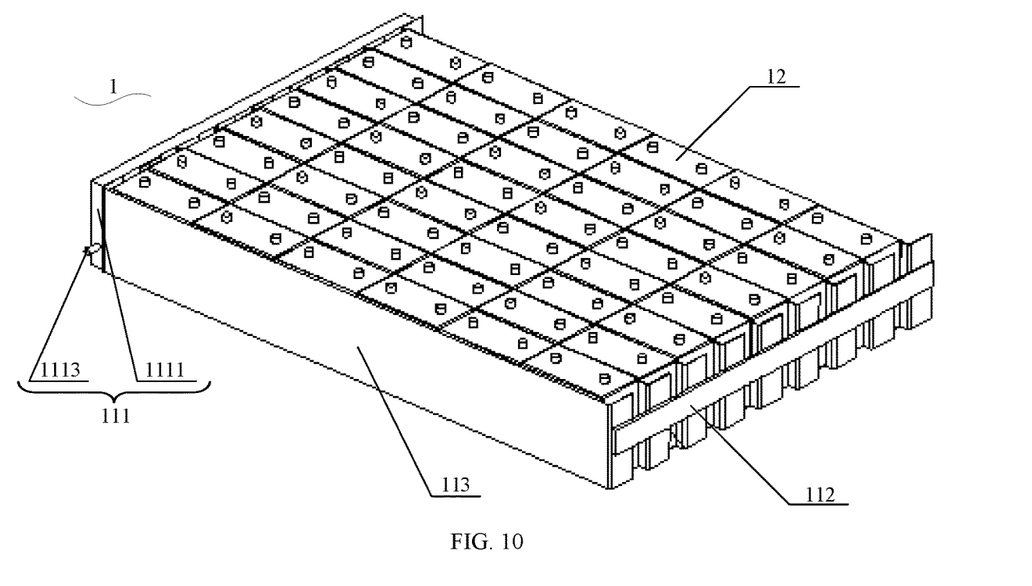
FIG. 10 shows a three-dimensional schematic diagram of a power battery pack having a heat superconducting heat exchanger according to Embodiment 2 of the present disclosure.
Figure 11:
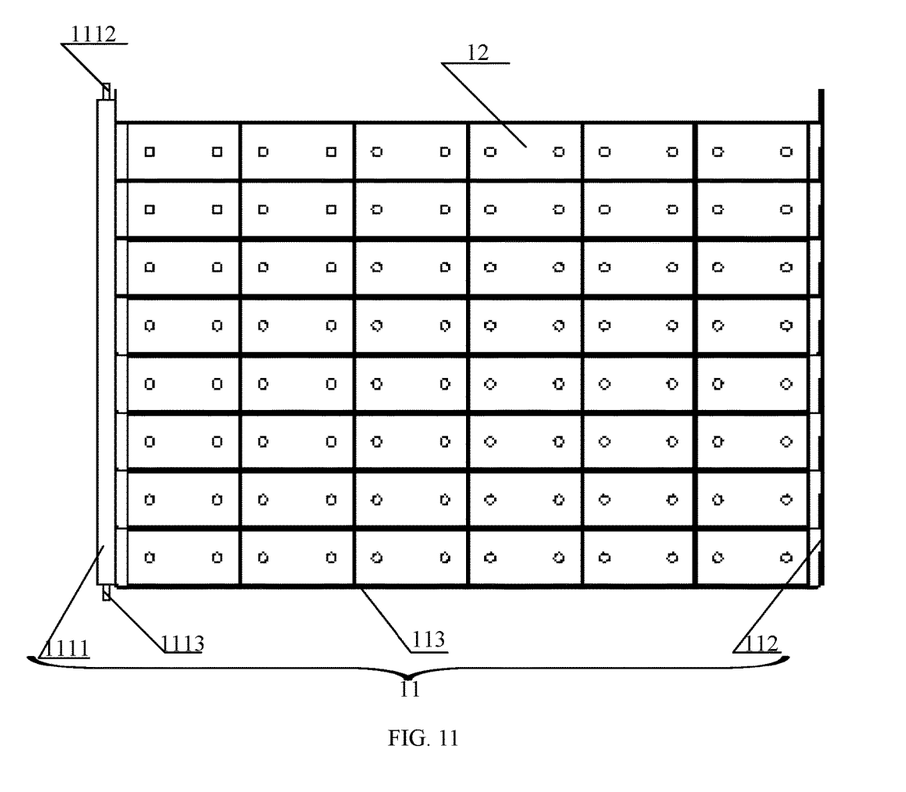
FIG. 11 shows a top view of a power battery pack having a heat superconducting heat exchanger according to Embodiment 2 of the present disclosure.
Figure 12:
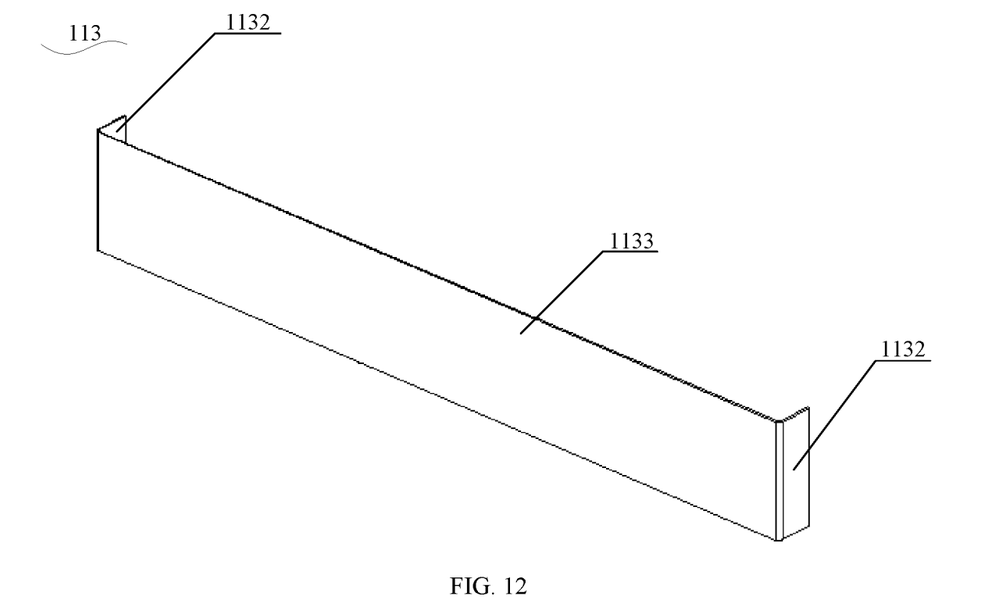
FIG. 12 shows a three-dimensional schematic diagram of a heat superconducting plate in a power battery pack having a heat superconducting heat exchanger according to Embodiment 2 of the present disclosure.

Referring to FIGS. 10-12, the present disclosure further provides another power battery pack 1 having a heat superconducting heat exchanger. The structure of the power battery pack 1 in this embodiment is basically the same as that in Embodiment 1. In the first embodiment, the heat superconducting plate 1313 includes a wave portion 1131 and a lateral portion 1132. The wave portion 1131 includes a first surface and a second surface opposite to the first surface. The wave portion 1131 further includes a plurality of first protrusion portions 11311 protruding toward the first surface and a plurality of second protrusion portions 11312 protruding toward the second surface. The first protrusion portions 11311 and the second protrusion portions 11312 are alternately distributed along the length direction of the heat superconducting plate 113 and connected as a whole. The lateral portion 1132 is located at two ends of the wave portion 1131, and is connected to both ends of the wave portion 1131. Specifically, the number of the lateral portion 1132 is two. One lateral portion 1132 is located at one end of the wave portion 1131 and is connected to this end of the wave portion 1131 as an integral structure, the other lateral portion 1132 is located at the other end of the wave portion 1131 and is connected to this end of the wave portion 1131 as an integral structure. The battery cells 12 are located on a first surface and a second surface of the wave portion 1131. The battery cells 12 disposed on the first surface end of the wave portion 1131 corresponds to the second protrusion portions 11312, and are attached to the second protrusion portions 11312. The battery cells 12 disposed on the second surface of the wave portion 1131 corresponds to the first protrusion portions 11311, and are attached to the first protrusion portions 11311. In this embodiment, the heat superconducting plate 113 includes a flat plate portion 1133 and a lateral portion 1132. The lateral portion 1132 is located at two ends of the flat plate portion 1133, and is connected to both ends of the flat plate portion 1133. The shape of each battery cell 12 is rectangular, the battery cells 12 are disposed between the adjacent flat plate portions 1133, and the battery cells 12 are attached to at least one of the adjacent flat plate portions 1133. Preferably, the battery cells 12 is attached to two adjacent flat plate portions 1133, and the distance between the two adjacent flat plate portions 1133 is the same as the lateral dimension of the battery cell 12.

Other structures and working principles of the power battery pack 1 having a heat superconducting heat exchanger described in this embodiment are the same as that in embodiment 1. For details, please refer to Embodiment 1, which is not described here.

It should be noted that FIGS. 10 and 11 only take the heat radiator 111 including the cooling plate 1111 as an example. In this example, the heat radiator 111 may further include a heat radiation fin 1114, as the heat radiator 111 in Embodiment 1, and the heat radiation fin 1114 is disposed on a surface of the cooling plate 1111. Of course, the heat radiator 111 in this embodiment may have a structure as shown in FIGS. 3 and 4 in Embodiment 1, that is, the heat radiator 111 may have a structure including the fixed base plate 1115 and the heat radiation fin 1114.

Embodiment 3

Figure 13:
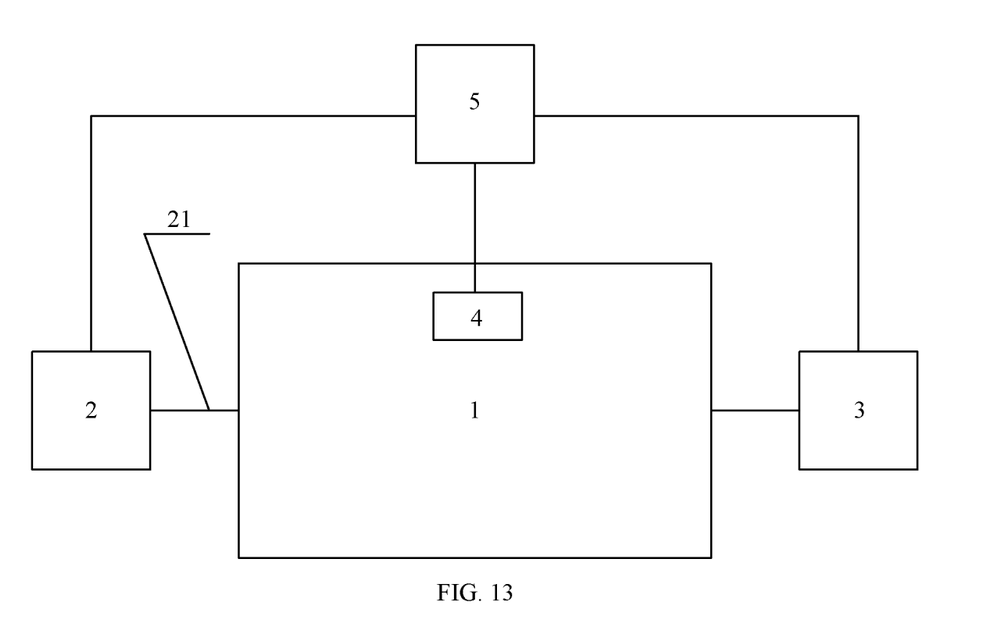
FIG. 13 shows a block diagram of the power battery pack system according to Embodiment 3 of the present disclosure.

Referring to FIG. 13, the present disclosure further provides a power battery pack system, including: a power battery pack 1 having a heat superconducting heat exchanger as described in Embodiment 1 or Embodiment 2; a cooling medium system, and a heating controller 3. The cooling medium system at least includes a cooling medium source 2, which provides a cooling medium to the heat radiator 111. The heating controller 3 is connected with the heater 112, and controls the operation of the heater 112.

As an example, when the heat radiator 111 has a structure including the cooling plate 1111 and the heat radiation fins 1114, the cooling medium source 2 may be a cooling water source or a cooling air source. The cooling medium system further includes a cooling medium supply pipeline 21 and a cooling medium discharge pipeline (not shown), one end of the cooling medium supply pipeline 21 is connected to the cooling medium source 2, and the other end of the cooling medium supply pipeline 21 is connected to the inlet of the cooling plate 1111. One end of the cooling medium discharge pipeline is connected to the outlet of the cooling plate 1111. When the heat radiator 111 has a structure including the fixed base plate 1115 and the heat radiation fins 1114, the cooling medium source 2 is a cooling air source, and the cooling medium source 2 dissipates the heat by blowing strong cooling air to the heat radiation fins 1114.

As an example, the power battery pack system further includes a temperature control system. The temperature system includes: a temperature measuring device 4, a temperature control device 5. The temperature measuring device 4 is disposed on the power battery pack 1 having a heat superconducting heat exchanger. Specifically, the temperature measuring device 4 may be disposed at any position of the power battery pack 1 having a heat superconducting heat exchanger for measuring the temperature of each battery cell 12. The temperature control device 5 is connected with the temperature measuring device 4, the cooling medium source 2 and the heating controller 3. The temperature control device 5 controls the cooling medium source 2 to provide the cooling medium to the heat radiator 111 (for example, controls the flow rate of the cooling medium source 2 into the cooling plate 1111 or controls the cooling medium source 2 to blow cold air to the heat radiation fins 1114) or controls the heating controller 3 to control the heating power of the heater 112 according to the result measured by the temperature measuring device 4.

Taking the heat radiator 111 including the cooling plate 1111 as an example, the working principle of the power battery pack system is: the temperature measuring device 4 detects the temperature of each battery cell 12 in real-time, when the battery cell 12 needs to be cooled, the temperature control device 5 controls the cooling medium source 2 to feed cooling medium into the cooling plate 1111 of the heat radiator 111, the heat generated by the battery cell 12 is conducted to the heat radiator 111 through the heat superconducting plate 113, then conducted outside the battery pack through the heat radiator 111; when the battery cell 12 needs to be heated, the temperature control device 5 controls the heating controller 3 to control the heating of the heater 112, the heat generated by the heater 112 is rapidly and evenly conducted to each battery cell 12 through the heat superconducting plate 113, such that each battery cell 12 is heated evenly.

In summary, the present disclosure provides a power battery pack having a heat superconducting heat exchanger, and a power battery pack system. The power battery pack having a heat superconducting heat exchanger includes a heat superconducting heat exchanger and a plurality of battery cells. The heat superconducting heat exchanger includes a heat radiator, a heater, and a plurality of heat superconducting plates arranged at intervals in parallel. The heater is located at one side of the heat radiator, and is spaced from the heat radiator. The heat superconducting plates are disposed between the heat radiator and the heater, one end of the heat superconducting plate is connected to the heat radiator, and the other end of the heat superconducting plate is connected to the heater. A heat superconducting pipeline is formed inside each heat superconducting plate, the heat superconducting pipeline is a closed pipeline, and the heat superconducting pipeline is filled with a heat transfer medium. The battery cells are located between the heat radiator and the heater, and each battery cell is in contact with the heat superconducting plate. The power battery pack having a heat superconducting heat exchanger according to the present disclosure adopts a heat superconducting plate for heat exchange with battery cells. By using the heat exchange method of heat superconducting, the equivalent thermal conductivity of the heat superconducting plate reaches 4000 W/m ° C. The heat superconducting plate has a fast heat-transfer rate, high heat-transfer efficiency, and even temperature. The problem of battery performance attenuation caused by uneven temperature and local over-temperature during quick charging and discharging of the battery cell in the power battery pack is reduced, thus improving the overall life of the power battery pack. By providing a heat radiator and a heater on the two ends of the heat superconducting plate, the power battery pack having a heat superconducting heat exchanger according to the present disclosure can rapidly heat the battery cells when the temperature of the battery cells is low, thereby improving the heating startup time of the battery cells at low temperature. Meanwhile, the battery cells can be cooled rapidly when the temperature is high. The power battery pack having a heat superconducting heat exchanger according to the present disclosure has the advantages of compact and flexible structure, small volume and weight, strong output capacity and high reliability, etc. The power battery pack system of the present disclosure can automatically control the temperature of the battery cells, and can automatically control the temperature of the battery cells within the optimal working temperature range.

The above-mentioned embodiments are merely illustrative of the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those who have common knowledge in the art without departing from the spirit and technical concept disclosed by the present disclosure shall be still covered by the claims of the present disclosure.

The invention claimed is:

1. A power battery pack having a heat superconducting heat exchanger, comprising the heat superconducting heat exchanger and a plurality of battery cells; wherein
the heat superconducting heat exchanger comprises a heat radiator, a heater, and a plurality of heat superconducting plates arranged at intervals in parallel; the heater is disposed at one side of the heat radiator, and is spaced from the heat radiator; the heat superconducting plates are disposed between the heat radiator and the heater, one end of the heat superconducting plate is connected to the heat radiator, and the other end of the heat superconducting plate is connected to the heater; a heat superconducting pipeline is formed inside the heat superconducting plate, the heat superconducting pipeline is a closed pipeline, and the heat superconducting pipeline is filled with a heat transfer medium; and the battery cells are disposed between the heat radiator and the heater, and each battery cell is in contact with the heat superconducting plate;
wherein the heat superconducting plate includes a first plate and a second plate bonded to a first surface of the first plate, wherein the heat superconducting pipeline is a concave channel formed in the first surface of the first plate, wherein a raised structure corresponding to the concave channel is formed on a second surface opposite to the first surface of the first plate.

2. The power battery pack having a heat superconducting heat exchanger according to claim 1, wherein the heat superconducting plate comprises a wave portion and a lateral portion;
the wave portion comprises a first surface and a second surface opposite to the first surface, the wave portion further comprises a plurality of first protrusion portions protruding from the first surface and a plurality of second protrusion portions protruding from the second surface, the first protrusion portions and the second protrusion portions are alternately distributed along a length direction of the heat superconducting plate and are connected as a whole;
the lateral portion is disposed at two ends of the wave portion, and is connected to the end of the wave portion;
each heat superconducting plate is connected to a surface of the heat radiator and a surface of the heater via the lateral portion; the battery cells are disposed on a first surface and a second surface of the wave portion, the battery cells disposed on the first surface of the wave portion corresponds to the second protrusion portions, and are attached to the second protrusion portions, and the battery cells disposed on the second surface of the wave portion corresponds to the first protrusion portions, and are attached to the first protrusion portions.

3. The power battery pack having a heat superconducting heat exchanger according to claim 2, wherein the first protrusion portions and the second protrusion portions are both arc-shaped protrusion portions, and a shape of the battery cells is a cylinder.

4. The power battery pack having a heat superconducting heat exchanger according to claim 2, wherein a length direction of the wave portion is perpendicular to a surface of the lateral portion; the wave portion and the lateral portion are an integrally formed structure.

5. The power battery pack having a heat superconducting heat exchanger according to claim 2, wherein a width of the wave portion is the same as a height of the battery cell, and a length of the lateral portion is the same as a height of the heat radiator.

6. The power battery pack having a heat superconducting heat exchanger according to claim 1, wherein the heat superconducting plate comprises a flat plate portion and a lateral portion;
the lateral portion is disposed at two ends of the flat plate portion, and is connected to the end of the flat plate portion;
each heat superconducting plate is connected to a surface of the heat radiator and a surface of the heater via the lateral portion;
a shape of the battery cells is rectangular, the battery cells are disposed between adjacent flat plate portions, and the battery cells are attached to at least one of the adjacent flat plate portions.

7. The power battery pack having a heat superconducting heat exchanger according to claim 6, wherein a length direction of the flat plate portion is perpendicular to a surface of the lateral portion; the flat plate portion and the lateral portion are an integrally formed structure.

8. The power battery pack having a heat superconducting heat exchanger according to claim 6, wherein a width of the flat plate portion is the same as a height of the battery cell, and a length of the lateral portion is the same as a height of the heat radiator.

9. The power battery pack having a heat superconducting heat exchanger according to claim 1, wherein the heat radiator at least comprises a cooling plate, a cooling pipeline is formed in the cooling plate, and the cooling plate includes an inlet and an outlet connected with the cooling pipeline.

10. The power battery pack having a heat superconducting heat exchanger according to claim 9, wherein a surface of the cooling plate is connected to one end of the heat superconducting plate, a length direction of the cooling plate is parallel to a length direction of the heater, and is perpendicular to a length direction of the heat superconducting plate.

11. The power battery pack having a heat superconducting heat exchanger according to claim 9, wherein the heat radiator further comprises a heat radiation fin, and the heat radiation fin is disposed on the cooling plate.

12. The power battery pack having a heat superconducting heat exchanger according to claim 1, wherein the heat radiator comprises a fixed base plate and a heat radiation fin provided on the fixed base plate.

13. The power battery pack having a heat superconducting heat exchanger according to claim 12, wherein a surface of the fixed base plate is connected to one end of the heat superconducting plate, a length direction of the fixed base plate is parallel to a length direction of the heater, and is perpendicular to a length direction of the heat superconducting plate; the heat radiation fin is plural in number, and a plurality of the heat radiation fin are inserted on a surface of the fixed base plate opposite to the heat superconducting plate.

14. A power battery pack system, comprising:
   a power battery pack having a heat superconducting heat exchanger according to claim 1;
   a cooling medium system, at least comprising a cooling medium source for providing a cooling medium to the heat radiator;
   a heating controller, connected with the heater for controlling an operation of the heater.

15. The power battery pack system according to claim 14, further comprising a temperature control system, the temperature control system comprises:
   a temperature measuring device, disposed on the power battery pack having a heat superconducting heat exchanger, the temperature measuring device measures a temperature of each battery cell;
   a temperature control device, connected with the temperature measuring device, the cooling medium source, and the heating controller, the temperature control device controls the cooling medium source to provide the cooling medium to the heat radiator or controls the heating controller to control a heating of the heater according to the result of the temperature measuring device.

* * * * *